US009424266B2

(12) United States Patent
Perlin et al.

(10) Patent No.: US 9,424,266 B2
(45) Date of Patent: Aug. 23, 2016

(54) EFFICIENT FILE HASH IDENTIFIER COMPUTATION

(75) Inventors: Eric C. Perlin, Redmond, WA (US); Ravisankar V. Pudipeddi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1071 days.

(21) Appl. No.: 11/906,302

(22) Filed: Oct. 1, 2007

(65) Prior Publication Data

US 2009/0089337 A1    Apr. 2, 2009

(51) Int. Cl.
*G06F 17/30* (2006.01)
*G06F 21/56* (2013.01)

(52) U.S. Cl.
CPC ... *G06F 17/30144* (2013.01); *G06F 17/30109* (2013.01); *G06F 21/565* (2013.01); *G06F 2221/2101* (2013.01)

(58) Field of Classification Search
CPC ................................................. G06F 17/30109
USPC ...................... 707/2, 3, 7, 747; 711/113, 216
See application file for complete search history.

(56) References Cited

U.S. PATENT DOCUMENTS

| 5,694,569 | A |   | 12/1997 | Fischer |   |
|---|---|---|---|---|---|
| 5,893,086 | A | * | 4/1999 | Schmuck | ............ G06F 11/1435 707/1 |
| 6,638,314 | B1 | * | 10/2003 | Meyerzon | ......... G06F 17/30864 707/999.01 |
| 7,069,594 | B1 |   | 6/2006 | Bolin |   |
| 7,188,230 | B2 | * | 3/2007 | Osaki | ...................... G06F 21/64 711/152 |
| 7,519,726 | B2 | * | 4/2009 | Palliyil | ............... H04L 67/2819 707/999.01 |
| 2002/0073276 | A1 | * | 6/2002 | Howard | .............. G06F 11/1004 711/113 |
| 2003/0120937 | A1 |   | 6/2003 | Hillis et al. |   |
| 2004/0220975 | A1 | * | 11/2004 | Carpentier | ........ G06F 17/30097 707/200 |
| 2004/0236761 | A1 |   | 11/2004 | Both |   |
| 2006/0161761 | A1 |   | 7/2006 | Schwartz et al. |   |
| 2006/0253440 | A1 |   | 11/2006 | Reed et al. |   |

(Continued)

FOREIGN PATENT DOCUMENTS

| EP | 1035482 A2 | 9/2000 |
|---|---|---|
| WO | 03034188 A2 | 4/2003 |

OTHER PUBLICATIONS

International Search Report and Written Opinion Received for PCT Application No. PCT/US2008/077155, mailed on Mar. 25, 2009, 11 pages.

(Continued)

*Primary Examiner* — Apu Mofiz
*Assistant Examiner* — Chelcie Daye
(74) *Attorney, Agent, or Firm* — Timothy Churna; Raghu Chinagudabha; Micky Minhas

(57) ABSTRACT

Described is maintaining cached hash values for files in association with state data for each file that represents the state of that file's contents at the time of hashing. For example, in a journaling file system, the state data may comprise the update sequence number of the file in the journal and a journal identifier for that journal instance. A request for a hash value for a file is processed by determining whether a cached hash value is maintained for that file. If so, and the associated maintained state data matches current state data for the file, the file contents are unchanged since the last hash computation, whereby the cached hash value is returned in response to the request. Otherwise, a new hash value is computed for the file and returned, and cached for future use. Multiple types of hashes may be cached for a given file.

20 Claims, 6 Drawing Sheets

(56) References Cited

U.S. PATENT DOCUMENTS

2007/0113045 A1* 5/2007 Challener ............. G06F 3/0623
 711/216
2008/0215849 A1* 9/2008 Scott ................. G06F 17/30949
 711/216

OTHER PUBLICATIONS

Goh, et al., "SiRiUS: Securing Remote Untrusted Storage", p. 1-15.
Stein, et al., "Unifying File System Protection", pp. 1-11.
Zhu, et al., "RACE: A Robust Adaptive Caching Strategy for Buffer Cache", pp. 1-9.
European Search Report Dated: Mar. 9, 2011 cited in related Application No. EP/08835852.8 (320980.04).
International Preliminary Report on Patentability cited in PCT Application No. PCT/US2008/077155 dated Apr. 7, 2010, 8 pgs.
Supplemental EP Search Report cited in EP Application No. 08835852.8 dated Mar. 28, 2011, 1 pg.
Reply to Supplemental EP Search Report cited in EP Application No. 08835852.8 dated Sep. 27, 2011, 17 pgs.
First Chinese Office Action cited in Chinese Application No. 200880110492.2 dated Jul. 22, 2011, 13 pgs.
Reply to first Chinese Office Action cited in Chinese Application No. 200880110492.2 dated Nov. 29, 2011, 30 pgs.
Second Chinese Office Action cited in Chinese Application No. 200880110492.2 dated Jun. 18, 2012, 7 pgs.
Reply to second Chinese Office Action cited in Chinese Application No. 200880110492.2 dated Jul. 6, 2012, 24 pgs.
Third Chinese Office Action cited in Chinese Application No. 200880110492.2 dated Nov. 14, 2012, 7 pgs.
Reply to third Chinese Office Action cited in Chinese Application No. 200880110492.2 dated Jan. 17, 2013, 23 pgs.
European Office action Appl. No. 08835852.8-1870, dated Mar. 2, 2015.

* cited by examiner

EFFICIENT FILE HASH IDENTIFIER COMPUTATION

BACKGROUND

It is becoming more and more relevant and valuable to ensure that a file that is installed on a computing system, especially an executable or a resource used by an executable, is verified before being executed or loaded into memory. For example, this prevents malware such as viruses from being executed, as well as preventing the running of applications that an IT administrator desires not be run. Verification ensures that only programs allowed to run on a machine are executed, thereby making the platform much more secure.

One of the ways of achieving verification is file hashing, in which the contents of the file are hashed using a secure hash by the developer of the software, or by a component on the operating system at install time. The hash is stored in a tamperproof place. When the file is executed or loaded, the file contents are again hashed and compared to the stored hash for that file (or set of hashes for allowed files). If the computed hash value does not match an allowed hash, the file has changed (e.g., was tampered with) in some way, or is one that is not allowed to run, whereby loading into memory and thus execution can be prevented. Note that another method of verification is to ensure that code needs to be signed, e.g., by X, Y or Z, whereby a step of the verification process is hashing (producing H), and a cryptographic signature (private key of X applied to H) attests that X signed that code.

Heavy consumers of file hashing (such as for verification when hash rules are used) can have a significantly negative performance impact on a system that is noticeable to users. This is because any executable that is loaded, including dynamically loaded (link) libraries (dlls), needs to be hashed, with the computed hash looked up into a list of allowed hashes.

Computing the hash is costly in a number of ways, including that most if not all of a file needs to be read from the disk for it to be hashed. Further, the content needs to be loaded into memory and this adds to memory paging pressure. Once loaded, the actual hashing of the memory content is also computationally intensive. Furthermore, the hashing operation can occur repeatedly for a given binary, since that binary may be loaded in many processes, (e.g., ntdll.dll, kernel32.dll, advapi32.dll, user32.dll, shell32.dll in the Microsoft® Windows® operating system).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which cached hash values for files are maintained in association with maintained state data for each file, in which the state data is representative of a state of that file's contents at a time of computing the hash value. For example, in computing environment in which a file system maintains a journal of changes to files and each change is associated with an update sequence number (USN), the state data comprises the update sequence number of the file and a journal identifier that identifies an instance of the journal.

A request for a hash value for a file is processed by determining whether a cached hash value is maintained for that file. If a hash value is maintained, and the associated maintained state data matches state data of a current state of the file, the file contents are known to be unchanged since the time of the hash computation, whereby the cached hash value for that file is returned in response to the request. Otherwise, a hash value is computed for the file and returned. The computed hash value may then be cached and associated with state data corresponding to the file contents' state at the time of the hash computation.

In one aspect, a hash data store contains entries (e.g., records) for files, in which each file has an entry for a hash and the associated state data, (e.g., in associated fields). A hash return mechanism coupled to the hash data store processes requests for hash values for files, including by accessing the hash data store for each such request. When the hash return mechanism locates an entry for a file in the hash data store, the hash return mechanism evaluates the state data associated with that file against current state data of the file. For example, the comparison may be of the update sequence numbers and journal identifiers of the maintained data and the current file state, respectively. If the comparison indicates the numbers and identifiers are equivalent, then the file contents are unchanged since the hashing time, and the maintained hash value for that file is returned in response to the request.

If the comparison fails, one or more optimizations may be performed to see if the hash value is still valid. For example, when the journal identifiers are equal but the update sequence numbers are not equal, the hash return mechanism may scan the journal for records between the update sequence numbers to determine whether any update is of a type that modified the file contents. If the only updates were not such a type, that is, all updates were non-modifying updates, the cached hash value may be used, otherwise the hash value needs to be recomputed. As another optimization, before performing the scan, a file size comparison may be used because different file sizes would indicate a change to the contents. Also, the scan may be bypassed and the hash value recomputed if there are too many updates to efficiently scan, e.g., when the difference between the sequence numbers exceeds an efficiency threshold. Such an optimization also may be bypassed when the journal does not contain all of the entries between USN in the cache and current USN of the file, e.g., the cached USN is less than the smallest USN in the journal (e.g., when the journal wraps the older entries are lost).

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
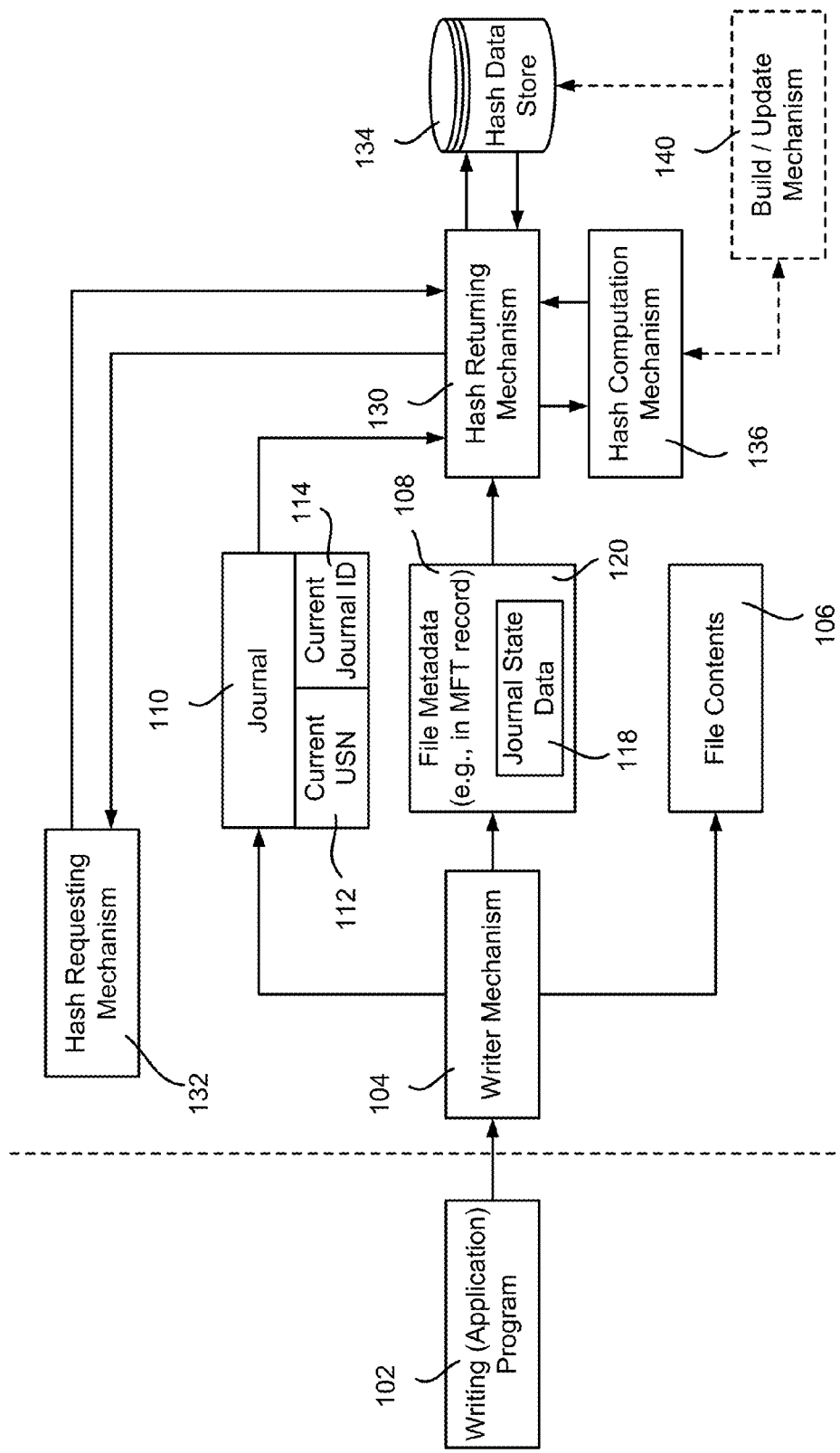
FIG. 1 is a block diagram representing example components for implementing an efficient file hash identifier computation mechanism.

Various aspects of the technology described herein are generally directed towards maintaining and leveraging a data store (cache) of hashes of files, such that the hash for a given file is only recomputed if and when that file may have changed. In a significant number of instances, the mechanism that returns a hash value for a specified file only need look up the hash value in a secure data store (e.g., cache table) of hashes, dramatically improving a computing system's performance.

To this end, the hash for a file (if an appropriate one exists from a previous hash computation) is maintained in association with state data indicative of the state of that file's contents (which may include a data stream, key attributes and/or an alternate data stream or streams) at the time of the last hash computation. Note that maintaining the state data at the "time" of hash computation need not be exact time of the computation, but rather refers to any time before the file contents can be changed. When a hash is requested for a file and the hash exists, the maintained state of that file is evaluated against the current state of that file. If the evaluation indicates that the file contents are unchanged, the cached hash is returned, otherwise the hash is computed and the computed hash returned.

In one example implementation, the maintained state data corresponds to updates to files that are tracked (logged in a journal) in the file system. For example, if the state data indicates that the current journal is valid and there are no tracked updates for that file in the journal, then the file contents are unchanged since the time of caching the hash value in the data store. As an option, if the state data indicates that journal is valid and there are tracked updates for that file, the updates may be evaluated to see whether any update is of a type that may have changed the file contents; if not, then the file contents are unchanged since the time of caching the hash value. When unchanged, the maintained hash may be efficiently looked up and returned, whereby there is no reason to re-compute a secure hash of the entire contents of the file. As can be readily appreciated, such an efficiency gain from a lookup is especially valuable for security/verification purposes, but may be used anytime a hash of a file's contents is desired.

In one example implementation, a possible change to a file's contents is by determined via metadata associated with the file and a file system journal that tracks any changes to files. Examples herein describe the use of the USN (update sequence number) and USN journal implemented by the Microsoft® Windows® NT file system (NTFS), which are primarily used by indexing and replication services. However, any journaling or other type of file system that logs file changes may benefit from the technology described herein. Further, any data that is computationally expensive to produce may benefit from caching as described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and file content hashing in general.

Turning to FIG. 1, there is shown an example file hash identifier computation mechanism including various components of a journaling file system that tracks changes to files, in which journaling is active (that is, turned on) for each desired volume for which the mechanism is used. A program (e.g., application) 102 makes changes to a file via a writer mechanism 104, and as a file's contents 106 (and/or one or more of its attributes maintained as part of the file's metadata 108) are changed, the journal 110 logs the reason for the change. The logged change data for a given update within the journal 110 is tracked by its association with a unique (per journal instance) update number 112 (e.g., the USN in NTFS); the journal also is associated with a journal identifier 114 that identifies the current instance of the journal relative to any previous instances, as described below.

To associate a file with a corresponding entry in the journal, upon an update, the journal's current state data 118 (e.g., including the current value of the USN in NTFS) are maintained as part of the file's recorded metadata 120 (e.g., in a master file table, or MFT, record for that file in NTFS). If the current journal instance is valid for the file, the file's recorded USN may be used to find that file's changes in the journal 110.

For example, in NTFS, when any attribute or data stream, or alternate named data stream changes on a file, the reason for the change (i.e. what changed, although the data itself is not logged) is logged in the journal 110 and the current USN (e.g., an incremented 64-bit number) for that volume is associated with the file that changed in the file's MFT record. Each file on a NTFS volume is thus associated with its own USN that corresponds to an entry in the journal (provided the journal is valid); NTFS guarantees that this USN is changed every time the file is updated. Note that in FIG. 1, the components to the right of the dashed line cannot be changed directly by the writing program 102. For example, the USN is tamperproof in that it cannot be changed by any entity in the system directly, but rather is only updated as a side-effect when a change to the file is made.

As described above, the USN journal 110 has a current journal ID 114. The journal ID is changed (and the USN's for all files are reset to zero) if the journal is stopped/restarted, if the journal wraps (e.g., due to storage limitations), or if the journal is truncated and restarted by disk recovery utilities for any reason. These conditions indicate that the current journal may not have a valid history of changes to files, unless those files have non-zero USNs and are thus associated with the current journal ID. Note that after restarting the journal, a zero length (non-modifying) 'touch' of any file will restore a valid USN value to that file. Further note that if the file's USN and the cached USN is zero (and the journal matches), the file has not been touched since the journal was restarted, and there is no need to touch the file.

As also shown in FIG. 1, there is shown a hash returning mechanism 130 which, on-demand from a hash requesting mechanism 132 (e.g., a secure hash comparison component), leverages the journal 110 and journal ID 114, along with the file metadata 120 including the file's journal state data 118, to determine whether a file's contents are certain to be unchanged relative to the corresponding state of a previously recorded hash. If so and a previously computed hash is maintained for that file, e.g., in a hash data store 134, then that maintained hash value may be used instead of re-computing a hash value. Otherwise a hash computation mechanism 136 is invoked to compute the hash for returning to the requesting mechanism 132.

Figure 2:
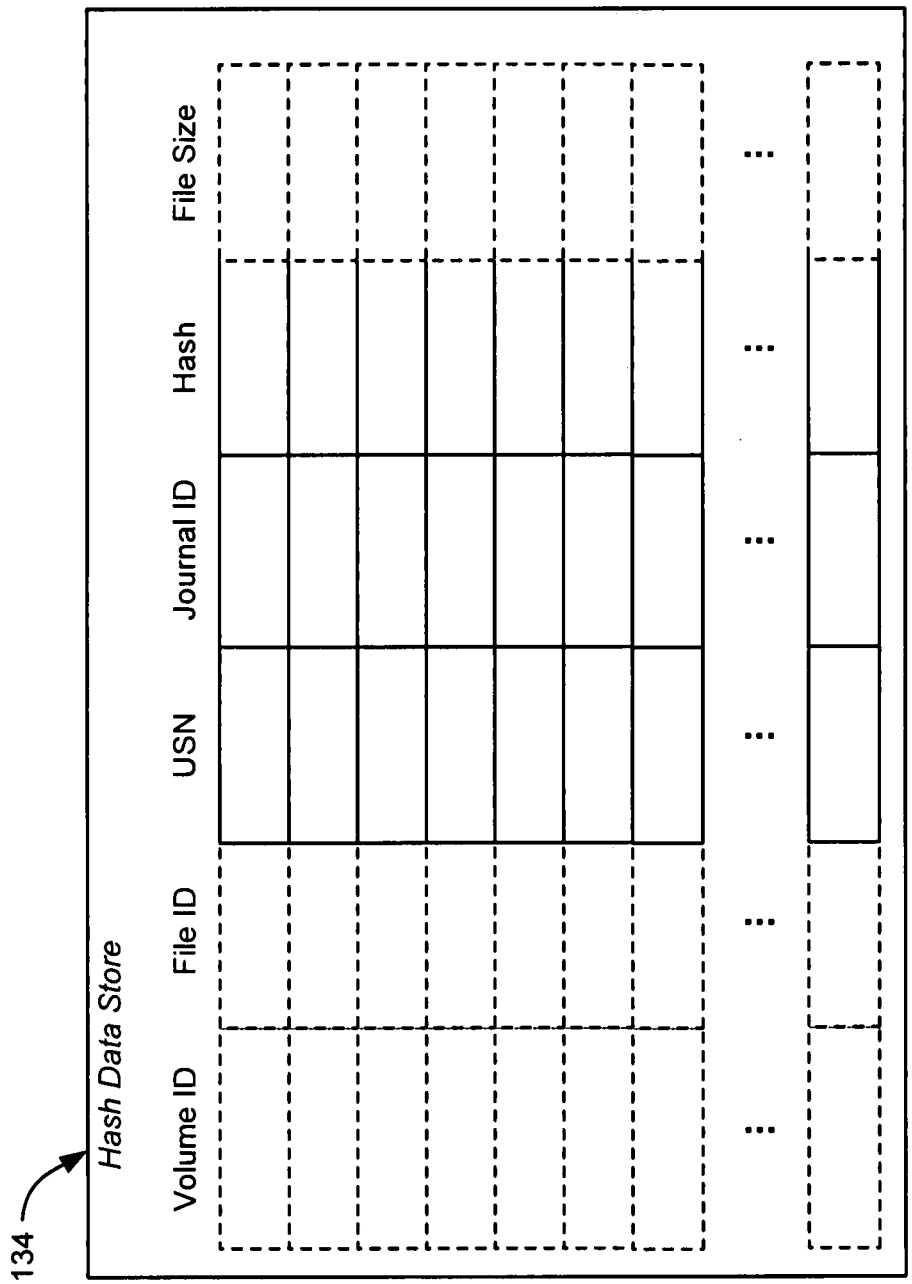
FIG. 2 is a representation of a data structure in the form of a hash data store (cache) for maintaining hash data for a file and state data at the time of the hash.

FIG. 2 is a representation of a data structure suitable for use as the hash data store 134, such as in the form of a set of records. In FIG. 2, each horizontal row is a record that represents a unique file, with various fields of each record as identified in the text above each column. Note that in FIG. 2, the solid boxes (USN, Journal ID and hash columns) represent fields used by the hash returning mechanism 130 of the example implementation of FIG. 1, while the dashed boxes represent optional fields (volume ID, file ID and file size purposes) that may be used for various hash-related purposes, as described below. Other columns for other file metadata also may be maintained as desired.

For each hashed file, the hash data store 134 maintains a hash value in conjunction with state data (the USN and journal ID) that enables the hash returning mechanism 130 to determine whether the file is unchanged since the time of computing the hash (whereby the hash value is still valid). Any suitable hash algorithm (MD5, or SHA-1 and/or any other well known algorithms) may be used; note that multiple, different types of hash values corresponding to different types of hashes and/or ways of computing the hash values may be maintained for a given file. For purposes of simplicity herein, a single type of hash computation will be described except where otherwise noted.

In general, the contents of the data stream and key attributes/alternate data streams are hashed using a secure hash. The hash data store 134 is secure, that is, in a tamperproof area of storage which is not accessible by any user.

The hash data store 134 may be initially empty and records built (or updated) as hashes are requested for files. Some or all of the hash data store 134 also may be built or updated in a foreground or background operation. For example, an optional mechanism 140 (FIG. 1) may look for any files (or certain file types such as executable files likely to have a hash requested), such as in the background when extra processing power is available or in a "lazy" manner, to build and/or update the data store 134. As yet another alternate, hashes may be computed as files are first imported into the system, that is, copied to a volume.

When a request for a file's content hash is made, the request is accompanied by a file handle. Additional data may be provided with the request, such as the type of hash requested in a system in which different types of hashes and/or ways of computing the hash are allowed.

From the file handle, the hash returning mechanism 130 obtains the file's journal data 118 (e.g., USN) and/or any other desired file metadata 120; e.g., in NTFS, the hash returning mechanism 130 can obtain that file's metadata record from the MFT. Note that from the file system, the hash returning mechanism 130 may also obtain the current journal ID 114 (and the current USN 112), and can also access the journal 110, as described below.

Using at least some of the file metadata 120, the hash returning mechanism 130 accesses the hash data store 134 seeking a record for the file. For example, the last USN (possibly in conjunction with the current journal ID) recorded in the file metadata may be used as a key. If a file identifier (file ID) is maintained in the data store 134, the file ID instead may be used as the key. For example, files have unique file IDs in NTFS, namely a 64-bit number that uniquely identifies a file on a given storage volume. The full pathname of a file is also unique to a volume, and thus is an alternative type of unique file identifier that may be used as a key or the like.

As also represented in FIG. 2, a volume identifier (e.g., a globally unique identifier, or GUID) may be optionally maintained in association with each record, whereby multiple volumes may share the same hash data store 134 by including the volume identifier as part of the key. Alternatively, each volume for which efficient hash identification/computation is desired may be associated with its own hash data store 134. For purposes of simplicity herein, a single volume will be described, although it should be noted that each volume has its own journal and journal data (e.g., USN and journal ID), and a file (pathname and/or file ID) and that file's metadata is only guaranteed to be unique per volume. Thus, in a multi-volume environment, additional logic is needed to access the correct journal, journal data and/or file data.

If a matching record is found in the hash data store 134, a hash has been previously computed and maintained for the requested file. If so, the maintained USN and journal ID in the hash data store 134 may be compared against the file's metadata (namely USN in this example) and the current journal ID 114 to determine whether the file contents have possibly changed since the hash was computed and stored. If from the hash state data, the current journal ID and the file USN the file contents are known to be unchanged, then the hash is still valid for that file, and can be returned from the hash data store 134.

As one optimization, it is possible that the USN recorded in the metadata for a file has increased for a file relative to the USN maintained in the hash data store 134, even though the file contents itself are not changed. For example, a change to a file's attribute may change the USN, but that attribute may not be an attribute that is part of the hash computation. It is thus possible to scan the changes logged in the journal 110 between a file's metadata-recorded USN and the hash data store's maintained value for that USN. For any logged change corresponding to that file, the reason for that change may be evaluated, and among that files changes, if no reason is found that corresponds to a file content (including any key attribute and/or alternate stream) change, the maintained hash is still valid. Note that as an efficient check before scanning, the metadata's recorded file size may be compared against a file size maintained in the hash data store for that file; if different, the contents cannot be the same, (however if the same, the contents still may be different whereby the scan is needed). As another efficiency mechanism, if the two USN values differ beyond some threshold at which scanning the change records between the two USN values is less efficient than re-computing the hash, then the scan can be bypassed.

Figure 3:
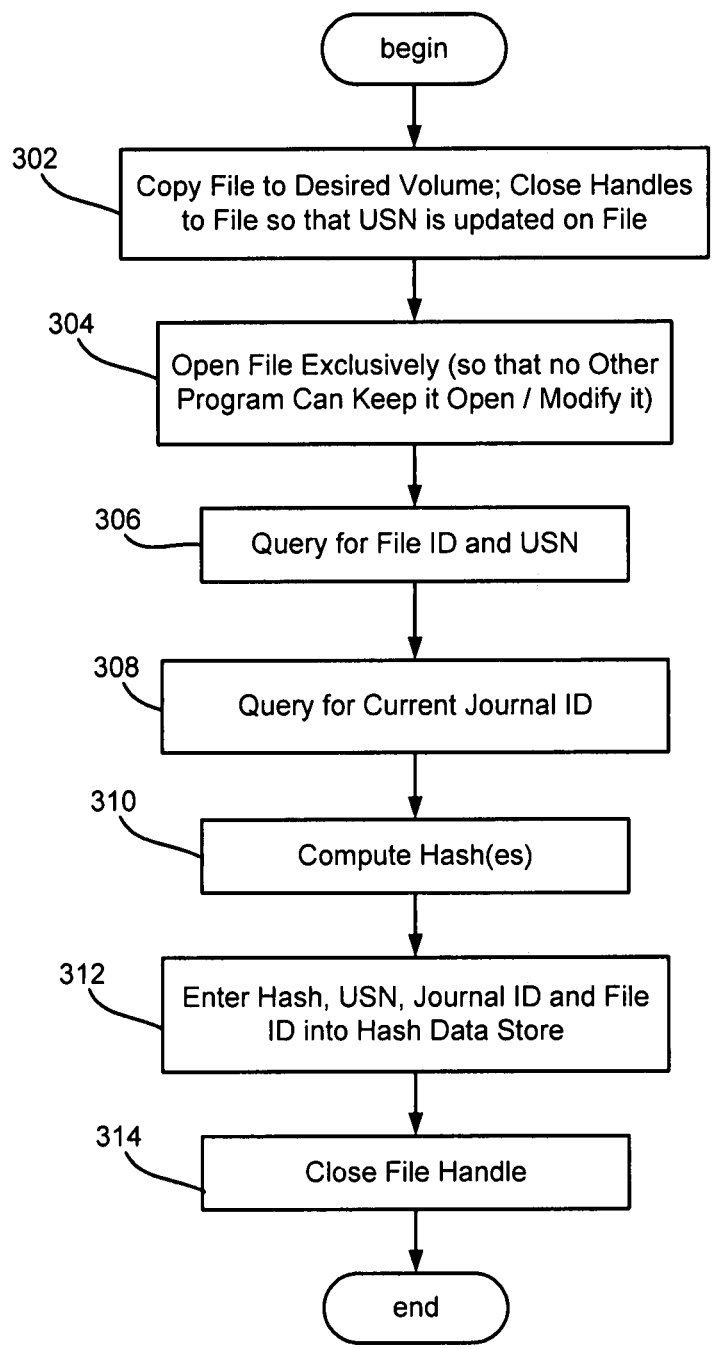
FIG. 3 is a flow diagram representing example steps taken to build the hash data store as a file is copied to a storage volume.

Turning to FIG. 3, there is shown a flow diagram by which a record may be entered into the hash data store for a file, e.g., upon copying that file to the desired volume (step 302). Step 302 also represents closing all handles to the file so that the USN is updated on the file, at the time of closing.

To maintain the hash-related data associated with the file, step 304 opens the file exclusively so that no other application can keep it open/modify the file while the hash returning mechanism 130 (or build/update mechanism 140) has it open. Note that this prevents the USN from changing because of another writer; it is feasible to allow reads to occur while open at this time.

Step 306 represents querying for the file ID, which will be used as the key to the file's record in this example, and also the USN. Note that using the file ID as the key (or at least recording the file ID with the record for later use as a key) provides an efficient way to remove a record if the file is later deleted. However, records corresponding to deleted files need not be deleted from the hash data store, although the hash data store can then grow unbounded.

Step 308 represents querying for the current journal ID, and step 310 represents computing the hash (or hashes) for the file. Step 312 enters the hash, USN, journal ID and file ID into the hash data store. Note that this record may now be indexed by the file ID in this example, although the USN alternatively may serve as a key. Step 314 closes the file handle.

At this time, the hash for the above file is maintained in the hash data store 134 along with state data that can be used to determine whether the file contents are later changed relative to that state. As described above, the entry process may be repeated as other files are copied, by a background (or foreground) mechanism 140, and/or as a hash is computed for a file, as described below.

Figure 4:
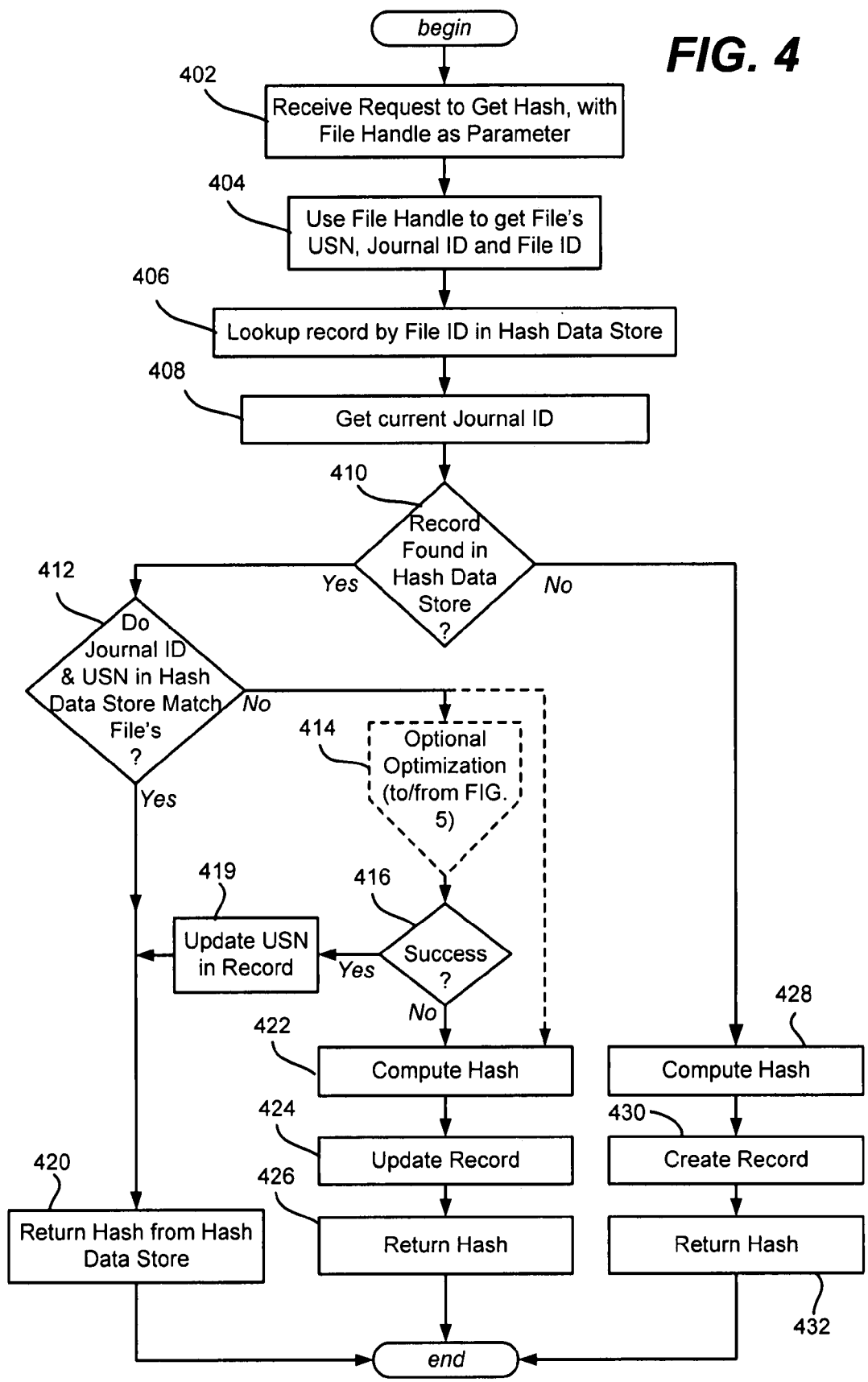
FIG. 4 is a flow diagram representing example steps that may be taken to return a hash value for a file in response to a request.
Figure 5:
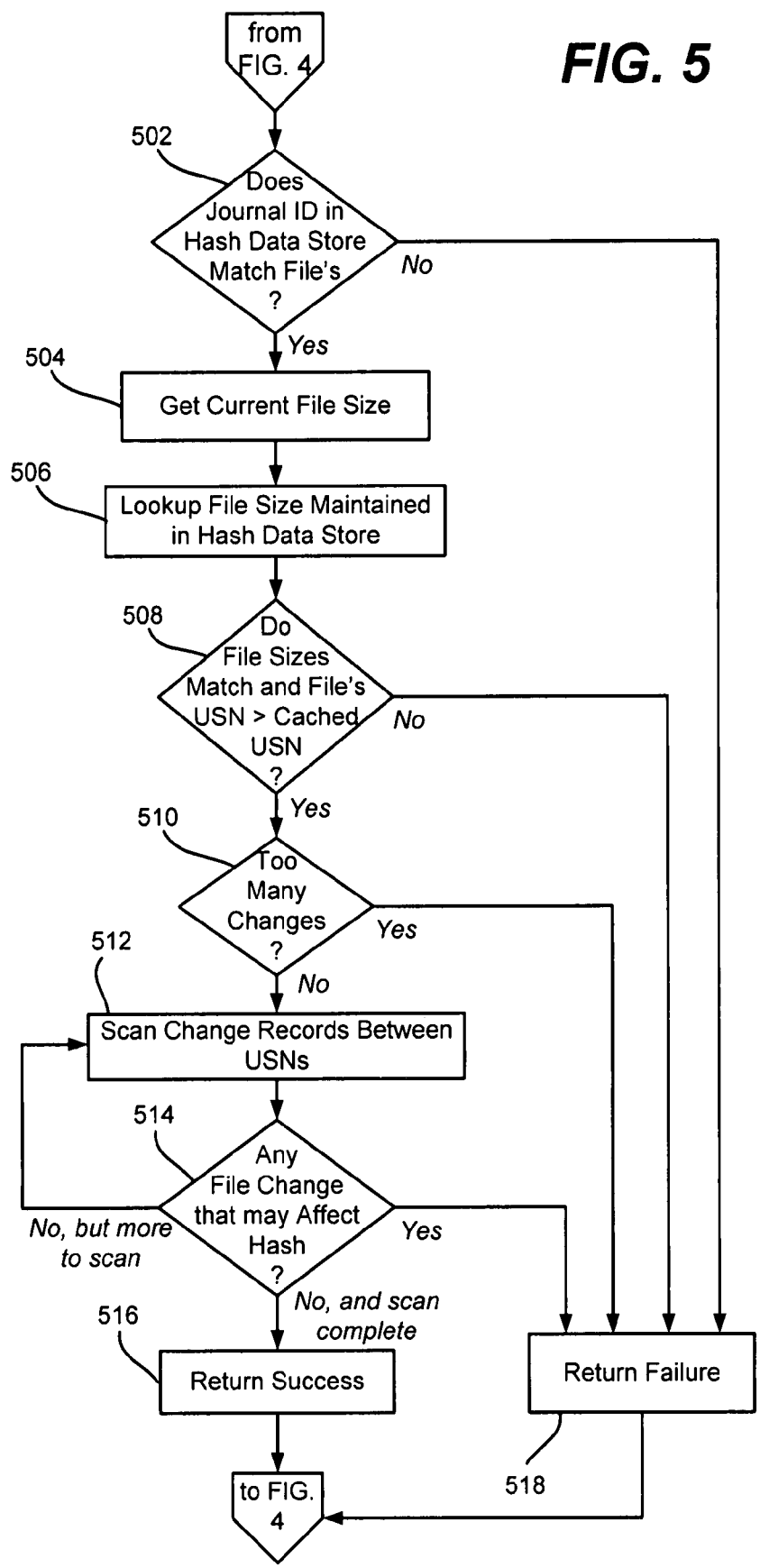
FIG. 5 is a flow diagram representing example optional steps that may be taken to return a hash value for a file in response to a request

FIG. 4 shows how one example hash return mechanism 130 (FIG. 1) operates, with FIG. 5 showing optional steps that may be performed. For example, the hash return mechanism 130 may be accessed via a function such as GetHash (in HANDLE hFile, in HASHTYPE HashType, out HASH Hash), where hFile represents the file handle. Step 402 represents receiving such a call, with at least the file handle as a parameter, (but further allowing for hash type information and any other suitable information to be provided). Note that the examples of FIGS. 4 and 5 assume that the caller has read access and has prevented writes.

Step 404 shows the mechanism 130 using the file handle to obtain the file's metadata, including the file ID and USN. Note that in this example, the file ID is used to look up the record in the hash data store at step 406. Step 408 gets the current file system journal ID.

If at step 410 no record is found in the hash data store via the lookup at step 406, then steps 428, 430 and 432 are executed, to compute the hash, create and store a record for this file in the hash data store and return the hash value, respectively. Note that the data needed to create to create the record are obtained via step 404 and 406, along with the hash value computed at step 428. It should be noted that step 410 implicitly handles different types of hashes, e.g., if no record is found with the correct type of hash, then steps 428, 430 and 432 are likewise executed.

If at step 410 a record was found in the hash data store via the lookup at step 406, step 412 is performed to evaluate the state data maintained therein against the recorded file's USN state and the current journal ID. If they both match, the file has not changed, and thus the maintained hash is known to be valid, whereby step 412 branches to step 420 to return the cached hash from the hash data store and the process ends.

If instead at step 412 no match exists, step 412 branches to optional step 414 (or directly to step 422 if the option is not used) to further investigate whether the file is unchanged. Note that step 422, 424 and 426 compute the hash, update the existing record for this file in the hash data store, and return the hash value, respectively.

Turning to the option of FIG. 5, step 502 evaluates whether the file system's current journal ID at least matches that maintained the hash data store record for this file. If not, there is no way to further tell whether the file has changed since the hash was recorded, and thus step 502 branches to the "failure" branch (step 518) in this optional process, whereby via step 416 of FIG. 4 steps 422, 424 and 426 the hash will be recomputed, used to update the hash data store record and returned, as described above.

If the journal IDs match, step 504 is then performed for efficiency to see whether the file size is unchanged, (because if changed the contents have also changed, although the converse is not necessarily true). Note that the file size is part of the file's metadata, and is thus readily available, and indeed, can be efficiently obtained as part of step 404. Step 506 looks up the maintained file size that in this example is cached in the hash data store at the time of the previous hash computation, (as represented in the optional "File Size" column of FIG. 2).

If at step 508 the file's current size and the previously cached size are evaluated against one another; if they do not match, the failure branch (step 518) is taken as described above. If they do match and the file's USN is greater than the cached USN (meaning the journal has not wrapped), there is still a possibility that the update (or updates) were of a non-modifying type of update. The journal will have these updates therein, somewhere between the file's USN and the USN recorded at the time of hashing in the hash data store.

Step 510 is a step that may be taken to determine if the scanning of the journal updates between the two USNs (determined to be non-equal via step 412 and implicitly by step 514) is less efficient than simply computing the hash. For example if the USNs are relatively close together, then scanning will be more efficient than if they are relatively far apart. Note that empirical testing, statistics and so forth can be used to determine such a threshold difference. If too far apart, the hash is computed by taking the failure branch at step 510 to step 518.

To scan, each of the entries between the two USNs are evaluated until either a content-modifying entry is found, or all have been scanned and indicate that there is no content modifying update for that file. Steps 512 and 514 represent such a scan, which ends and takes the failure branch to step 518 as soon as any content-modifying entry is found. Otherwise the scan completes without finding a content-modifying entry, and success is returned at step 516. As can be seen by returning to step 416 of FIG. 4, the success branch results in the USN being updated in the file's record (step 419) of the hash data store, and the hash value being returned from the hash data store (step 420).

Exemplary Operating Environment

Figure 6:
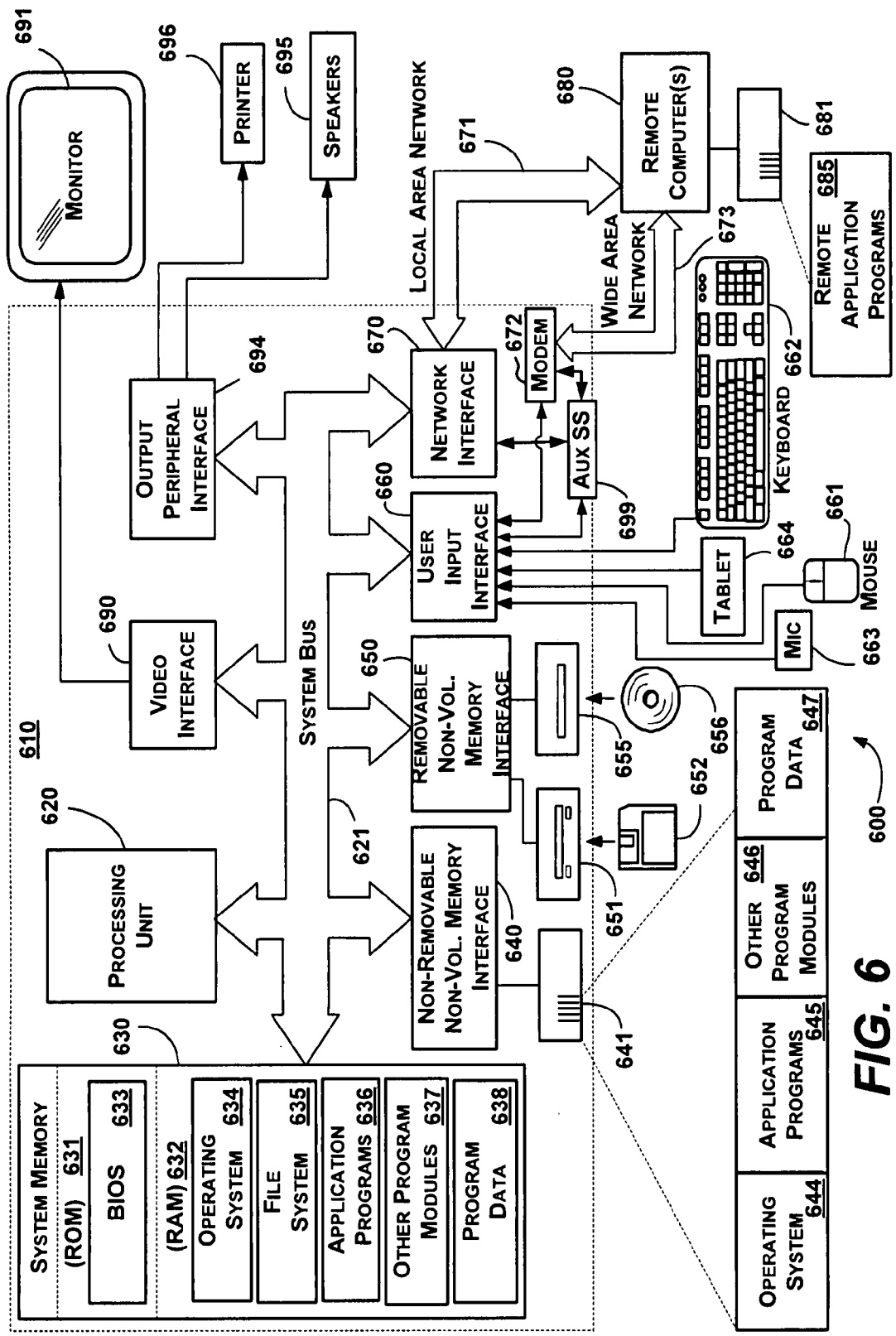
FIG. 6 shows an illustrative example of a computing environment into which various aspects of the present invention may be incorporated.

FIG. 6 illustrates an example of a suitable computing system environment 600 on which the examples represented in FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, file system 635, application programs 636, other program modules 637 and program data 638.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 636, other program modules 637, and program data 638. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method, implemented at a computer system that includes a processing unit, for determining whether to compute a new hash value for a file, comprising:
    identifying a first state of a file;
    computing a first hash value corresponding to the first state of the file;
    recording the first hash value corresponding to the first state of the file and first state data corresponding to the first state of the file, the first state data comprising at least one of an update sequence number and a journal identifier that both correspond to the first state of the file, the update sequence number comprising an incrementable number that is changed every time the file is updated and the journal identifier comprising an identifier of a current instance of a journal;
    receiving a request for a second hash value of the file corresponding to a current second state of the file;
    based at least on receiving the request, and prior to computing the second hash value corresponding to the second state of the file, determining whether to provide the first hash value corresponding to the first state of the file or to compute the second hash value corresponding to the second state of the file based on a determination of whether or not contents of the file have changed since the first hash value corresponding to the first state of the file was computed, the determination of whether or not contents of the file have changed comprising comparing the recorded first state data corresponding to the first state of the file to current second state data of the file that indicates a second state of the file at the time of the request, to determine whether the contents of the file are the same between the first state and the second state, the contents of the file being the same when the first state data is equivalent to the second state data, at least one of the first state data of the file or the second state data of the file comprising at least one of an update sequence number and a journal identifier;
    based on determining that the first state data of the file is equivalent to the second state data of the file based upon the comparison, providing the first hash value corresponding to the first state of the file in response to the request, instead of computing the second hash value; and
    based on determining that the first state data of the file is not equivalent to the second state data of the file based upon the comparison, computing the second hash value for the file.

2. The method of claim 1, at least one of the first state data of the file or the second state data of the file comprising the update sequence number.

3. The method of claim 1, at least one of the first state data of the file or the second state data of the file comprising the journal identifier.

4. The method of claim 1, at least one of the first state data of the file or the second state data of the file comprising the file size information.

5. The method of claim 1, the comparing first state data of the file to second state data of the file comprising at least one of:
    comparing the update sequence number of the first state data to an update sequence number of the second state data, and
    comparing the journal identifier of the first state data to a journal identifier of the second state data.

6. The method of claim 1, the comparing first state data of the file to second state data of the file comprising:
    comparing the update sequence number of the first state data to an update sequence number of the second state data, and
    comparing the journal identifier of the first state data to a journal identifier of the second state data.

7. The method of claim 1, the first state data equivalent to the second state data when the first state data matches the second state data.

8. The method of claim 1, the first state data equivalent to the second state data when at least one of:
    the journal identifier of the first state data matches a journal identifier of the second state data, and
    a file size corresponding to the first state of the file is equal to a file size of the file at a time the request is received.

9. The method of claim 1, the first state data equivalent to the second state data when a difference between the update sequence identifier of the first state data and an update sequence identifier of the second state data is less than a specified threshold.

10. A computer-readable hardware storage device comprising computer-executable instructions that are executable by one or more processors of a computer system to configure the computer system to determine whether to compute a new hash value for a file, the computer-executable instructions including instructions that are executable to configure the computer system to perform at least the following:

identify a first state of a file;

compute a first hash value corresponding to the first state of the file;

record the first hash value corresponding to the first state of the file and first state data corresponding to the first state of the file, the first state data comprising at least one of an update sequence number and a journal identifier that both correspond to the first state of the file, the update sequence number comprising an incrementable number that is changed every time the file is updated and the journal identifier comprising an identifier of a current instance of a journal;

receive a request for a second hash value of the file corresponding to a current second state of the file;

based at least on receiving the request, and prior to computing the second hash value corresponding to the second state of the file, determine whether to provide the first hash value corresponding to the first state of the file or to compute the second hash value corresponding to the second state of the file based on a determination of whether or not contents of the file have changed since the first hash value corresponding to the first state of the file was computed, the determination of whether or not contents of the file have changed comprising comparing the recorded first state data of the file corresponding to the first state of the file to current second state data of the file that indicates a second state of the file at the time of the request, to determine whether the contents of the file are the same between the first state and the second state, the contents of the file being the same when the first state data is equivalent to the second state data, at least one of the first state data of the file or the second state data of the file comprising at least one of an update sequence number and a journal identifier;

based on determining that the first state data of the file is equivalent to the second state data of the file based upon the comparison, provide the first hash value corresponding to the first state of the file in response to the request instead of computing the second hash value; and based on determining that the first state data of the file is not equivalent to the second state data of the file based upon the comparison, compute the second hash value for the file.

11. A computer system for determining whether to compute a new hash value for a file, comprising:

one or more processing units; and at least one computer readable storage devices having stored thereon computer-executable instructions that are executable by the one or more processing units to cause the computer system to determine whether to compute a new hash value for a file, the computer-executable instructions including instructions that are executable to cause the computer system to perform at least the following:

identify a first state of a file;

compute a first hash value corresponding to the first state of the file;

record the first hash value corresponding to the first state of the file and first state data corresponding to the first state of the file, the first state data comprising at least one of an update sequence number and a journal identifier that both correspond to the first state of the file, the update sequence number comprising an incrementable number that is changed every time the file is updated and the journal identifier comprising an identifier of a current instance of a journal;

receive a request for a second hash value of the file corresponding to a current second state of the file;

based at least on receiving the request, and prior to computing the second hash value corresponding to the second state of the file, determine whether to provide the first hash value corresponding to the first state of the file or to compute the second hash value corresponding to the second state of the file based on a determination of whether or not contents of the file have changed since the first hash value corresponding to the first state of the file was computed, the determination of whether or not contents of the file have changed comprising comparing the recorded first state data corresponding to the first state of the file to current second state data of the file that indicates a second state of the file at the time of the request, to determine whether the contents of the file are the same between the first state and the second state, the contents of the file being the same when the first state data is equivalent to the second state data, at least one of the first state data of the file or the second state data of the file comprising at least one of an update sequence number and a journal identifier;

based on determining that the first state data of the file is equivalent to the second state data of the file based upon the comparison, provide the first hash value corresponding to the first state of the file in response to the request, instead of computing the second hash value; and based on determining that the first state data of the file is not equivalent to the second state data of the file based upon the comparison, compute the second hash value for the file.

12. The computer system of claim 11, the first state data comprising at least one of:

the update sequence number corresponding to the first state of the file;

the journal identifier corresponding to the first state of the file; and file size information describing a size of the file corresponding to the first state of the file.

13. The computer system of claim 11, the comparing first state data of the file to second state data of the file comprising at least one of:

comparing the update sequence number of the recorded state data to an update sequence number of the current state data, and comparing the journal identifier of the recorded state data to a journal identifier of the current state data.

14. The computer system of claim 11, the first state data equivalent to the second state data when the first state data matches the second state data.

15. The computer system of claim 11, the first state data equivalent to the second state data when at least one of:

the journal identifier of the first state data matches a journal identifier of the second state data; and a file size of the file corresponding to the first state of the file is equal to a file size of the file at the time the request is received.

16. The computer system of claim 11, the first state data equivalent to the second state data when a difference between the update sequence identifier of the first state data and an update sequence identifier of the second state data is less than a specified threshold.

17. The computer system of claim 11, the first state data equivalent to the second state data when one or more differences between the first state data and the second state data indicate that content of the file has not been modified between when the first state data was created and when the second state data was created.

18. The computer system of claim 11, the actions comprising:
   accessing the first state data and the first hash value corresponding to the first state of the file via at least one of a file identifier or a volume identifier.

19. The computer system of claim 11, the comparing first state data of the file to second state data of the file comprising:
   determining if an update sequence number of the second state data that is not comprised in the first state data is indicative of an update of a type that alters contents of the file.

20. The method of claim 1, wherein the first state data comprises both the update sequence number and the journal identifier.

* * * * *